(12) United States Patent
Goegge et al.

(10) Patent No.: US 8,448,524 B2
(45) Date of Patent: May 28, 2013

(54) MAGNETIC INDUCTIVE FLOW METER

(75) Inventors: Joern Goegge, Oberfloersheim (DE); Michael Zimmerman, Addison, PA (US); Raymond Pstir, Irwin, PA (US)

(73) Assignee: Sensus USA Inc., Raleigh, NC (US)

( * ) Notice: Subject to any disclaimer, the term of this patent is extended or adjusted under 35 U.S.C. 154(b) by 0 days.

(21) Appl. No.: 13/323,289

(22) Filed: Dec. 12, 2011

(65) Prior Publication Data

US 2012/0144929 A1    Jun. 14, 2012

Related U.S. Application Data

(63) Continuation of application No. PCT/EP2010/003502, filed on Jun. 11, 2010.

(30) Foreign Application Priority Data

Dec. 19, 2009 (DE) ............... 20 2009 017 274 U
Dec. 19, 2009 (DE) ............... 20 2009 017 275 U

(51) Int. Cl.
  *G01F 1/58* (2006.01)
(52) U.S. Cl.
  USPC ....................................... 73/861.12
(58) Field of Classification Search
  USPC ......................... 73/861.11–861.13
  See application file for complete search history.

(56) References Cited

U.S. PATENT DOCUMENTS

| | | | |
|---|---|---|---|
| 3,274,831 A | 9/1966 | Cushing | |
| 4,428,241 A | 1/1984 | Davis et al. | |
| 5,280,727 A | 1/1994 | Hafner et al. | |
| 5,307,687 A * | 5/1994 | Arai et al. | 73/861.12 |
| 5,852,362 A * | 12/1998 | Batenburg et al. | 324/204 |
| 6,260,420 B1 * | 7/2001 | Ketelsen et al. | 73/861.12 |
| 6,626,048 B1 | 9/2003 | Dam Es et al. | |
| 7,251,877 B2 | 8/2007 | Thai et al. | |
| 7,472,605 B2 * | 1/2009 | Knill et al. | 73/861.12 |
| 8,006,569 B2 | 8/2011 | Gögge et al. | |
| 2007/0022823 A1 | 2/2007 | Knill et al. | |

FOREIGN PATENT DOCUMENTS

| | | |
|---|---|---|
| DE | 10 2006 060443 A1 | 6/2008 |
| DE | 10 2007 004826 A1 | 8/2008 |
| DE | 10 2007 005670 A1 | 8/2008 |
| EP | 1 616 152 B1 | 1/2006 |
| GB | 1 145 461 A | 3/1969 |

\* cited by examiner

*Primary Examiner* — Jewel V Thompson
(74) *Attorney, Agent, or Firm* — Muncy, Geissler, Olds & Lowe, PLLC

(57) ABSTRACT

A magnetic-inductive flow meter is provided that includes a pressure-resistant plastic housing that includes an inlet port, an outlet port, and an intermediate measuring unit that has a duct wall and a measurement duct through which the fluid to be measured flows. Two opposite measuring electrodes are arranged in the duct wall and are oriented perpendicular to the magnet poles. Taking into account the maximum admissible pressure for the selected plastic, the duct wall is reduced to a minimum admissible thickness in the region of the magnet poles. An internal reinforcement cage that includes at least two internal transverse bulkheads and at least two internal longitudinal ribs stabilizes the duct wall. An external reinforcement cage that includes at least two first external longitudinal ribs retains and stabilizes the internal reinforcement cage and connects the measuring unit in a tension-proof manner to the inlet port and the outlet port.

15 Claims, 2 Drawing Sheets

MAGNETIC INDUCTIVE FLOW METER

This nonprovisional application is a continuation of International Application No. PCT/EP2010/003502, which was filed on Jun. 11, 2010, and which claims priority to U.S. patent application Ser. No.: 12/457,483, which was filed on Jun. 12, 2009, and to German Patent Application Nos. DE 20 2009 017 274.0, which was filed in Germany on Dec. 19, 2009, and to DE 20 2009 017 275.9, which was filed in Germany on Dec. 19, 2009, and which are all herein incorporated by reference.

BACKGROUND OF THE INVENTION

1. Field of the Invention

The invention relates to magnetic inductive flow meters.

2. Description of the Background Art

Magnetic inductive flow meters use a measuring method that is based on Faraday's law of electromagnetic induction. The first basis for the magnetic inductive measurement of the flow velocity of fluids was reported in 1832 in a publication by Michael Faraday. Modern electronic switching technology in conjunction with alternating magnetic fields made it possible to overcome the separation of the useful signals, proportional to the flow velocity, from interference signals, which occur in electrochemical processes during the generation of the magnetic field at the electrodes used for signal decoupling. Thus, nothing seemed to stand in the way of the wide industrial use of magnetic inductive flow meters.

The measuring principle of magnetic inductive flow meters utilizes the separation of moving charges in a magnetic field. The conductive fluid to be measured flows through a tube which is made of nonmagnetic material and whose interior is electrically insulated. A magnetic field is applied from the outside by means of coils. The charge carriers present in the conductive fluid, such as ions and other charged particles, are deflected by the magnetic field: the positive charge carriers to one side and the negative charge carriers to another side. A voltage, which is detected with a measuring device, arises owing to the charge separation at measuring electrodes arranged perpendicular to the magnetic field. The value of the measured voltage is proportional to the flow velocity of the charge carriers and thereby proportional to the flow velocity of the measuring fluid. The flow volume can be determined over time by integration.

In magnetic fields generated by pure alternating voltage, induction of interference voltages occurs in the electrodes, which must be suppressed by suitable and costly filters. For this reason, the magnetic field is usually generated by a clocked direct current of alternating polarity. This assures a stable zero point and makes the measurement insensitive to effects by multiphase substances and inhomogeneities in the fluid. In this way, a usable measuring signal can also be achieved at a low conductivity.

If a measuring fluid moves through the measuring tube, according to the induction law a voltage is present at both measuring electrodes, which are arranged in the measuring tube perpendicular to the flow direction and perpendicular to the magnetic field. This voltage in the case of a symmetric flow profile and a homogeneous magnetic field is directly proportional to the average flow velocity. The inductive flow measuring method is capable of generating an electrically usable signal for further processing directly from the flow. The following equation basically applies:

$$U = k*B*D*v$$

where U=voltage, k=proportionality factor, B=magnetic field strength, D=tube diameter, and v=flow velocity.

The selection of the proper electrode material is critical for the reliable function and measuring accuracy of the magnetic inductive flow meter. The measuring electrodes are in direct contact with the medium and must therefore be sufficiently corrosion-resistant and ensure good electrical transfer to the measuring fluid. The following are used as electrode materials: stainless steel, CrNi alloys, platinum, tantalum, titanium, and zirconium. Sintered electrodes are also used in the case of measuring sensors with ceramic measuring tubes.

EP 1616152 B1, which corresponds to US Publication No. US 20070022823, which is incorporated herein by reference, and which discloses improved electrodes. These electrodes have a metal, and a salt of the metal is arranged so that it is located between the metal and the fluid, whereby the salt layer is either applied electrochemically or sintered on. Silver as the salt silver chloride or silver fluoride is preferred as the metal. A porous protective element, for example, a glass frit, can be mounted in front of the silver electrode as protection against dirt.

A possible realization of a magnetic inductive flow meter is disclosed in U.S. Pat. No. 6,626,048 B1, which is incorporated by reference. This publication presents the physical and electronic fundamentals.

It is understood that major problems must be solved in the practical realization of a magnetic inductive flow meter.

In one respect, this is a matter of the material. The measuring tube must be amagnetic in order not to interfere with the magnetic field. The measuring tube further must be electrically insulating in order not to interfere with the picking up of the voltage with use of the electrodes. Moreover, the tube should have a food-safe material, when the liquid is a food, for example, drinking water.

These requirements can be fulfilled best when a food-safe plastic is used as the material. Nevertheless, plastics have the disadvantage of a much lower strength compared with metal. Resistance to internal pressure, however, is an essential requirement. The attempt to achieve internal pressure resistance with an increased thickness of the tube wall is not practicable, because otherwise the magnetic field would be weakened too greatly.

Another problem with plastics is water diffusion. This causes swelling of the plastic, as a result of which the dimensions particularly of the measuring channel change, which leads to a deterioration in the measuring accuracy. Water diffusion also greatly reduces the strength of the plastic. In fiber-reinforced plastics, the adhesion between the plastic and fiber is also partially lost.

During measurement of warm and hot fluids, the plastic softens and the strength also declines.

Chemicals, e.g., chlorine, in the measuring fluid can also attack the plastic. This also applies to UV radiation.

Furthermore, the meter housing must be tension-resistant, because considerable tensile stress can occur when a meter is screwed into existing tubing, e.g., in the screw thread. Tensile stress, particularly long-term tensile stress, is damaging to plastics, however, in particular the thinner the plastic material.

During installation on-site, other forces can act on the plastic, which lead to damage, when no provisions have been made by the design engineers and manufacturers.

SUMMARY OF THE INVENTION

The present invention has as its object to provide a magnetic inductive flow meter, which overcomes the aforementioned problems and whose plastic housing is resistant both to the internal pressure originating from the measuring fluid and to tensile stress, as well as to other thermal and mechanical loads.

In the area of magnetic field lines, the wall of the measuring channel is optimally thin, so that a homogeneous magnetic field of optimal strength is achieved. The internal pressure of the measuring fluid is absorbed by the inner reinforcement cage, having two inner transverse partitions and at least two inner longitudinal ribs.

The inner reinforcement cage is supported in addition by an outer reinforcement cage, having at least two first outer longitudinal ribs. The main task of the outer reinforcement cage, however, is to protect the measuring section of the housing and particularly the area with the minimum wall thickness from tensile stress originating from the connecting pieces.

A further advantage of this form is that the housing can be produced by an injection molding process.

Advantageously, the measuring channel has a rectangular cross section. A homogeneous magnetic field can be realized optimally in this way.

According to an embodiment of the invention, the inner longitudinal ribs have recesses in the area of the reduced channel wall for mounting the magnetic poles.

In addition, the inner longitudinal ribs may have in areas additional recesses for mounting additional structural components or for anchoring materials for the protection of the measuring electronics.

To achieve a high pressure resistance, the inner transverse partitions are preferably positioned directly before and behind the reduced channel wall.

According to an embodiment of the invention and to reinforce the housing, the outer reinforcement cage comprises in addition at least two second outer longitudinal ribs oriented perpendicular to the first outer longitudinal ribs.

For further bracing in the transverse direction, at least two outer transverse partitions can also be provided.

For the optimal transfer of tensile forces from the outer reinforcement cage to the connecting pieces, wedge-shaped reinforcement ribs are good options, which pass the magnetic flux to the inlet connecting pieces and outlet connecting pieces.

An optimal construction is then present when the relative linear expansion of the measuring section reinforced by the inner and outer reinforcement cage, said expansion which is caused by tension at the inlet connecting pieces and outlet connecting pieces, is not greater than the relative linear expansion of the connecting pieces themselves. It is prevented in this way that individual parts of the housing can be overexpanded.

According to an embodiment of the invention, the measuring section, including the magnetic poles and electrodes, is enclosed with an insulating layer. This can occur, for example, by molding, whereby the material also penetrates into the aforementioned recesses.

An electrical and/or magnetic shielding surrounds the entire measuring section. In this case, the shielding can be mechanically connected to the connecting pieces or the outer transverse partitions. In this way, the shielding can supplement the function of the outer reinforcement cage.

The housing can be made of a suitable reinforced plastic, particularly fiber-reinforced thermoplastic.

According to an embodiment of the invention, the housing can have two separately produced individual parts, the actual pressure-resistant housing and an external measuring module. The housing has a recess for the separate module, preferably insertable by raising/lowering. The module comprises at least the inner transverse partitions, the measuring channel, the electrodes, and the magnetic poles.

According to another embodiment of the invention, the housing can have three separately produced individual parts, connected to one another in a tension-resistant manner. The inlet and outlet connecting pieces are formed identical. The production of the plastic parts can be streamlined in this way. The ends of the measuring unit are sealed fluid-tight by seals in recesses in the connecting pieces.

The magnetic poles abut the channel wall not only externally but can also be integrated into the channel wall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
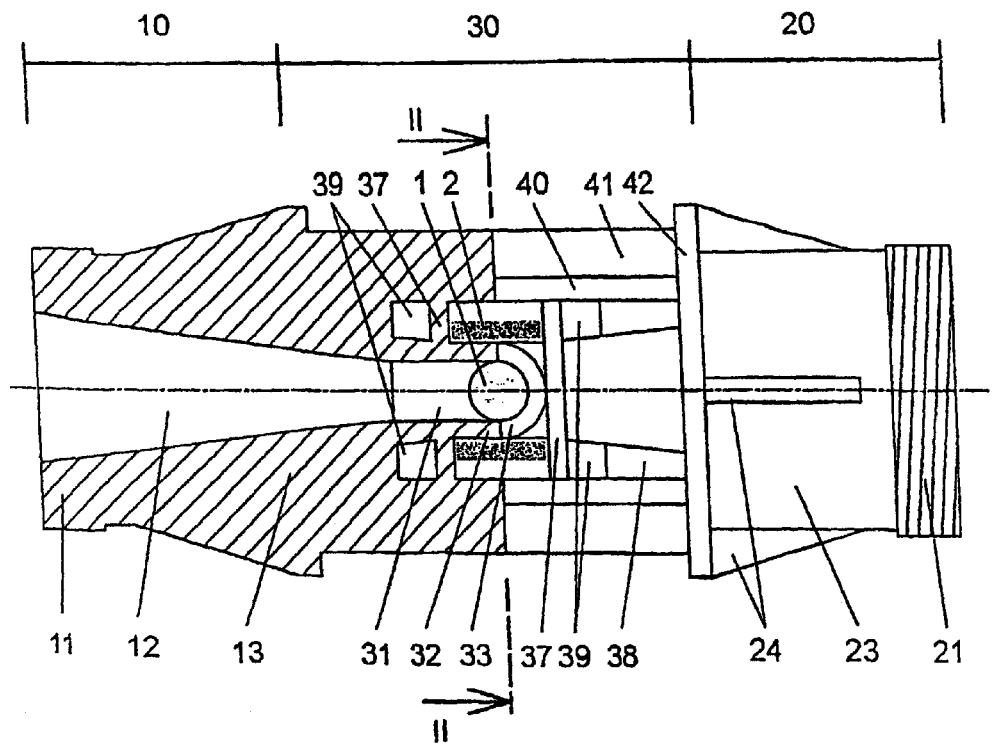
FIG. 1 shows a plan view of a pressure-resistant, one-part plastic housing, cut away on half of a side, for a magnetic inductive flow meter.

FIG. 1 shows purely schematically and not true to scale a plan view of a pressure-resistant, one-part plastic housing, cut longitudinally on half of a side, for a magnetic inductive flow meter. Three functional units are evident: an inlet connecting piece 10, an outlet connecting piece 20, and a measuring section 30 between these, which has measuring channel 31, through which measuring fluid flows, with a channel wall 32, two opposing magnetic poles 2 outside on channel wall 32, and two opposing measuring electrodes 1, oriented perpendicular to magnetic poles 2, in channel wall 32. The thickness of channel wall 32 is reduced in the area of magnetic poles 2 to the extent permissible with consideration of the maximum inner pressure of the measuring fluid in measuring channel 31, so that a homogeneous magnetic field generated by magnetic poles 2 is sufficiently strong in the area of measuring channel 31.

To absorb the internal fluid pressure, an inner reinforcement cage is provided, having at least two inner transverse partitions 37 and at least two inner longitudinal ribs 38. Inner transverse partitions 37 are located directly before and behind channel wall 32 of minimal thickness to absorb the deformations of channel wall 32. The inner longitudinal ribs 38, which brace the long channel walls 32, have the same task but must be cut out at least in the area of magnetic poles 2.

Inner longitudinal ribs 38 may have in areas additional recesses 39 for mounting possible additional structural parts or for anchoring insulating sealing compound.

In addition to the inner reinforcement cage, an outer reinforcement cage is provided having two first outer longitudinal ribs 40, two second outer longitudinal ribs 41, oriented perpendicular thereto, and two outer transverse partitions 42. The outer reinforcement cage and in particular first outer longitudinal ribs 40 support the inner reinforcement cage in addition against internal fluid pressure.

The main task of the outer reinforcement cage, however, is to absorb tensile stress, which arises during the exertion of tensile forces on the inlet and outlet connecting pieces 10, 20. Without the inner and outer reinforcement cage, this tensile stress would damage the housing in the area of the reduced channel wall 32. This is prevented by the outer reinforcement cage.

An optimal transfer of tensile stress from the outer cage and in particular its transverse partitions 42 to the inlet and outlet connecting pieces 10, 20 is achieved by wedge-shaped reinforcement ribs 14, 24.

Figure 2:
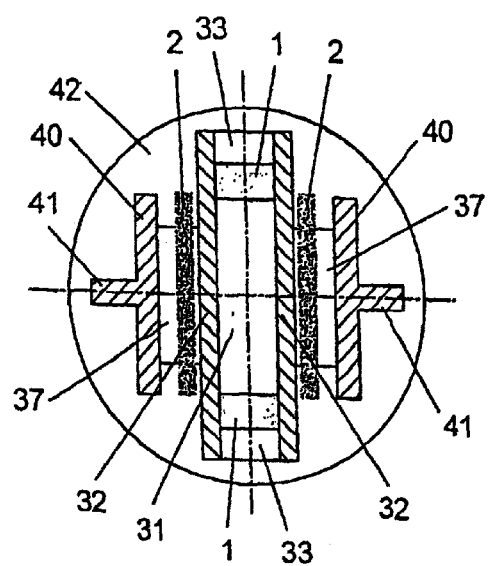
FIG. 2 shows a cross section through the housing of FIG. 1 along the line II-II.

FIG. 2 shows a cross section along the line II-II through the housing of FIG. 1. The rectangular measuring channel 31 can be seen, bounded on the right and left by the reduced channel wall 32, whose outer side is abutted by magnetic poles 2. A transverse partition 37 of the inner reinforcement cage is visible; of the outer reinforcement cage, the first and second outer longitudinal ribs 40, 41 are evident in section, as well as an outer transverse partition 42.

Finally, measuring electrodes 1, which are oriented perpendicular to magnetic poles 2, are evident in FIG. 2. Measuring electrodes 1 are held and protected by a housing collar 33.

The one-part design shown in FIGS. 1 and 2 is not the only one possible.

Figure 3:
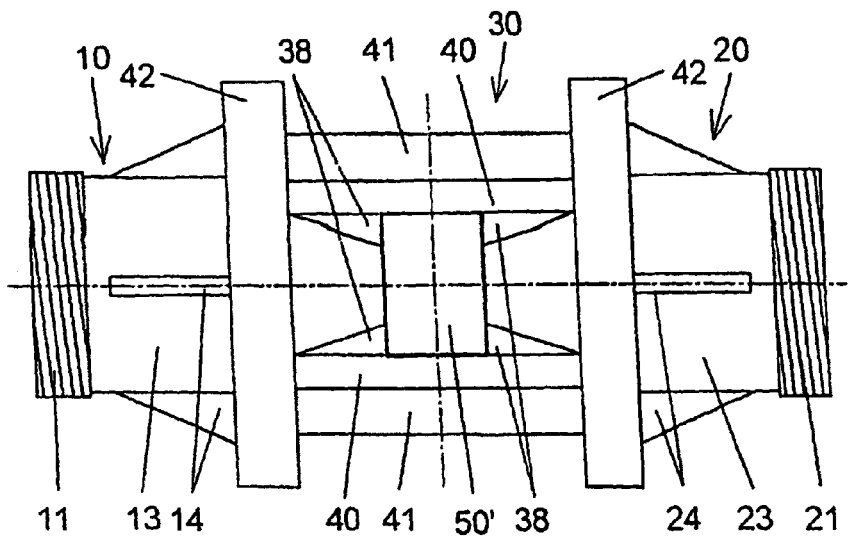
FIG. 3 shows a two-part housing as an exploded view.
Figure 3:
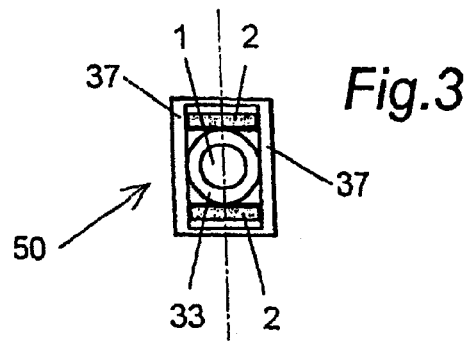

FIG. 3 shows a two-part design. Inlet connecting piece 10, outlet connecting piece 20, outer reinforcement cage 40, 41, 42, and the first inner longitudinal ribs 38 of the inner reinforcement cage form a unit. A recess 50' is located in the center of the housing. The measuring chamber, formed as an independent module 50, can be placed by raising/lowering and sealed in this recess with electrodes 1, magnetic poles 2, and inner transverse partitions 37.

Figure 4:
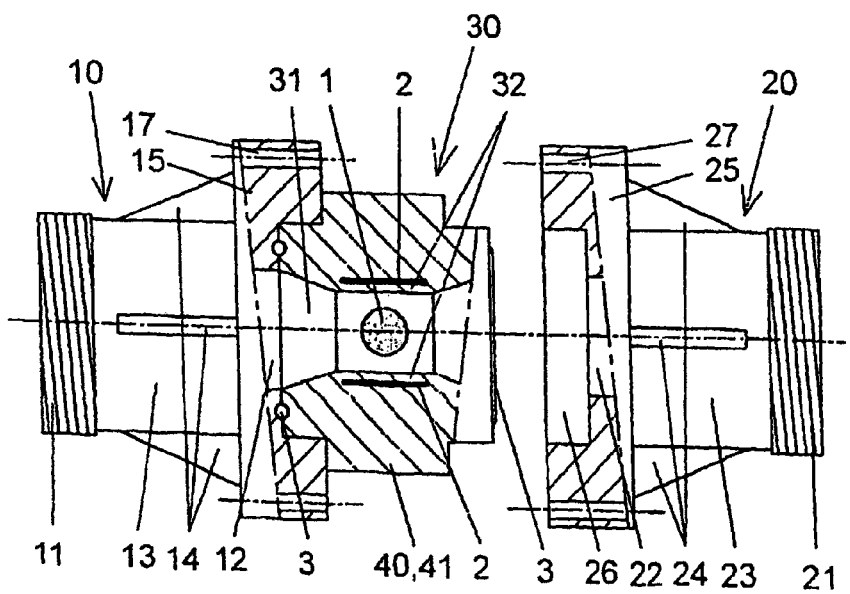
FIG. 4 shows a partial section of a three-part housing, also as an exploded view.

FIG. 4 shows a three-part design in a partially cut view. Inlet connecting piece 10 and outlet connecting piece 20 are formed identical. Their reinforced flanges 15, 25 each have a recess 16, 26, in which measuring section 30 is inserted with the aid of seals 3. Bored holes 17, 27 make it possible to use lag screws for tension-resistant connection of the three housing parts 10, 20, 30.

In the example of FIG. 4, magnetic poles 2 are molded in the wall of the measuring channel. As a result, it is possible to bring magnetic poles 2 extremely close to the measuring channel. The inner and outer longitudinal ribs are formed on measuring unit 30; reinforced flanges 15, 25 also take over the function of the outer transverse partitions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic inductive flow meter having a pressure-resistant plastic housing, the flow meter comprising:
    an inlet connecting piece;
    an outlet connecting piece; and
    a measuring unit arranged between the inlet connecting piece and the outlet connecting piece, the measuring unit comprising:
        a measuring channel configures such that the measuring fluid flows there through;
        a channel wall;
        two opposing magnetic poles at the measuring channel; and
        two opposing measuring electrodes oriented substantially perpendicular to the magnetic poles in the channel wall,
    wherein, with consideration of the maximum permissible internal pressure for the selected plastic, the channel wall is reduced to a still permissible extent in the area of the magnetic poles,
    wherein an inner reinforcement cage, having at least two inner transverse partitions and at least two inner longitudinal ribs, stabilizes the channel wall, and
    wherein an outer reinforcement cage, having at least two first outer longitudinal ribs, holds and stabilizes the inner reinforcement cage and connects the measuring unit in a tension-resistant manner to the inlet connecting piece and the outlet connecting piece.

2. The flow meter according to claim 1, wherein the measuring channel has a rectangular cross section.

3. The flow meter according to claim 1, wherein the inner longitudinal ribs have recesses in the area of the reduced channel wall for mounting the magnetic poles.

4. The flow meter according to claim 1, wherein the inner longitudinal ribs have, in areas, additional recesses adapted for mounting additional structural parts and/or for anchoring insulating sealing compound.

5. The flow meter according to claim 1, wherein the inner transverse partitions are positioned directly before and behind the reduced channel wall.

6. The flow meter according to claim 1, wherein the outer reinforcement cage further comprises at least two outer transverse partitions.

7. The flow meter according to claim 1, wherein the outer reinforcement cage further comprises at least two second outer longitudinal ribs oriented substantially perpendicular to the first outer longitudinal ribs.

8. The flow meter according to claim 1, wherein wedge-shaped reinforcement ribs pass the magnetic flux of the first and/or second outer longitudinal ribs to the inlet connecting piece and the outlet connecting piece.

9. The flow meter according to claim 1, wherein a relative linear expansion of the measuring unit reinforced by the inner and outer reinforcement cage, said expansion which is caused by tension at the inlet connecting piece and outlet connecting piece, is not greater than the relative linear expansion of the connecting pieces themselves.

10. The flow meter according to claim 1, wherein the measuring unit is enclosed on an outside with a covering.

11. The flow meter according to claim 1, wherein an electrical and/or magnetic shielding surrounds the measuring unit, and wherein the shielding is mechanically connected to the connecting pieces or the outer transverse partitions.

12. The flow meter according to claim 1, wherein the magnetic poles are integrated into the channel wall.

13. The flow meter according to claim 1, wherein the housing is formed of reinforced plastic or fiber-reinforced thermoplastic.

14. The flow meter according to claim 1, wherein the housing is formed of two separately produced individual parts, wherein the measuring unit has a recess for a separate module that is insertable by raising/lowering, and wherein the module comprises at least the inner transverse partitions, the measuring channel, the electrodes, and the magnetic poles.

15. The flow meter according to claim 1, wherein the housing is formed of three separately produced individual parts connected to one another in a tension-resistant manner, and wherein the ends of the measuring unit are sealed fluid-tight by seals in recesses in the connecting pieces.

* * * * *